No. 628,096.  
W. C. HUMPHREYS.  
BICYCLE SUPPORT AND LOCKING DEVICE.  
(Application filed May 22, 1897.)  
(No Model.)
Patented July 4, 1899.
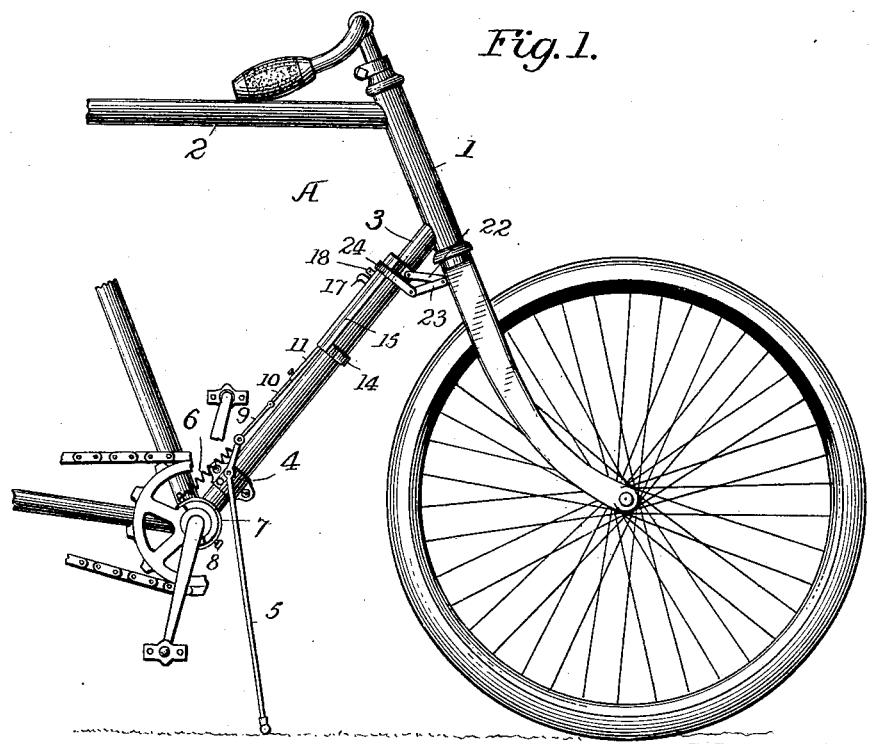
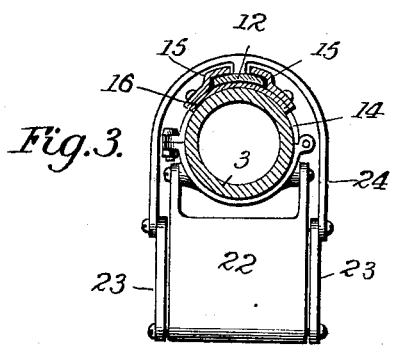
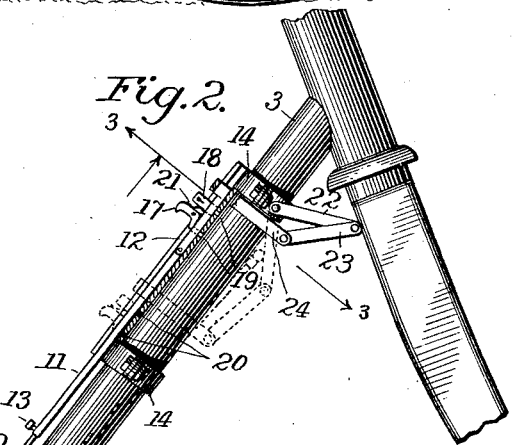
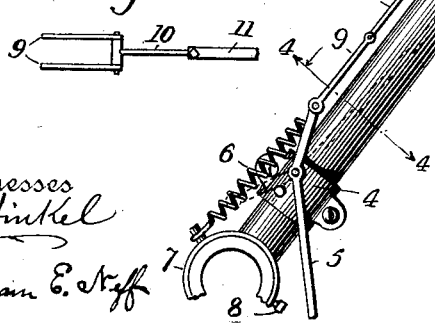
Witnesses  
J. G. Hinkel  
William E. Neff
Inventor  
W. C. Humphreys  
by Watson & Watson  
Attorneys
THE NORRIS PETERS CO., PHOTO-LITHO., WASHINGTON, D. C.

UNITED STATES PATENT OFFICE.

WALTER C. HUMPHREYS, OF SALISBURY, MARYLAND.

BICYCLE SUPPORT AND LOCKING DEVICE.

SPECIFICATION forming part of Letters Patent No. 628,096, dated July 4, 1899.

Application filed May 22, 1897. Serial No. 637,720. (No model.)

*To all whom it may concern:*

Be it known that I, WALTER C. HUMPHREYS, a citizen of the United States, residing at Salisbury, in the county of Wicomico and State of Maryland, have invented certain new and useful Improvements in Bicycle Supports and Locking Devices, of which the following is a specification.

My invention consists in a support and locking device for bicycles which is simple in construction and which can be readily attached to any machines of modern construction.

It is customary in standing a bicycle on the street, as well as indoors, to lean the saddle or handle-bar against the side of a building or a post or other support. It is often difficult to find a suitable support for the bicycle, and it also requires considerable skill to place the bicycle so that it will not fall. Moreover, this manner of supporting bicycles results in scratching and disfiguring the saddle and handle-bar, as well as other parts of the machine. My improved support prevents the bicycle from moving forward or backward and from tipping over sidewise, and it also holds the front wheel in alinement with the rear wheel, which greatly aids in insuring stability.

In the accompanying drawings, Figure 1 is a side view of part of a bicycle provided with a support embodying my invention. Fig. 2 is an enlarged side view, partly in section, of a part of Fig. 1. Fig. 3 is a section on the line 3 3 of Fig. 2. Fig. 4 is a section on the line 4 4, Fig. 2; and Fig. 5 is a detail.

Referring to the drawings, A indicates a bicycle-frame having the usual head 1, upper bar 2, and lower bar 3. On the lower bar, near the crank-hanger, is a band or collar 4, upon which two supporting-legs 5 are pivoted. The legs are pivoted in such a manner that when turned down, as shown in full lines, they project laterally at a considerable angle, as shown in Fig. 4, and reach the ground-line. When raised or folded, they lie close to the lower bar 3, as shown in dotted lines, Fig. 2. The collar to which the legs are connected consists of two parts clamped upon the bar 3 by means of screws or bolts 4ª above and below the bar. By adjusting the bolts 4ª the supports 5 may be spread to a greater or less angle and the feet of the supports raised or lowered. In this manner the supports can be adapted to bicycle-frames of different heights and the spread or base of the supports can be varied. The supports are normally drawn up close to the bar 3 by a spring 6, which may be connected to the crank-hanger directly or to an adjustable collar 7 on said crank-hanger. As shown, it is connected to the adjustable collar, which is held in position by a set-screw 8. A single spring may be connected to both of the legs, or they may be provided with separate springs. The upper ends of the legs are connected by links 9 and rods 10 11 with a locking-slide 12. The rods 10 11 are adjustable in relation to each other. As shown, the rod 11 is hollow, and the rod 10 fits in telescopically and is held in place by a set-screw 13.

Upon the upper portion of the lower bar 3 are two removable bands 14, upon which are fastened a pair of guides 15, which have flanges embracing the slide 12. Beneath the slide is the keeper-plate 16, connected with the bands 14. The locking-plate slides within the grooves adjacent to the keeper-plate, and it is provided with a latch 17 and a lock 18, the tongues of which engage with openings 19 in the keeper-plate when the supporting-legs are down and with openings 20 in the keeper-plate when the supporting-legs are up. The latch and lock may be of any suitable construction. As shown, the latch has a pivoted lever pressed down by a spring 21, and the lock is in a case which projects above the latch. Ordinarily the latch only may be used; but when it is desired to lock the bicycle the key is turned in the lock. To shift the slide and turn the supports up or down, the bolt of the lock is first withdrawn and then the latch is operated by pressing it toward the lock. When the latch is withdrawn, the slide may be adjusted and locked.

To make a bicycle stand satisfactorily, it is necessary to lock the front fork from turning in the head. This also forms an effectual lock to prevent the wheel from being stolen, as it cannot be ridden while the front fork is rigid. I provide the following devices for thus locking the front fork: Pivoted to the upper band 14 is a brace 22, which can be thrown against the front fork, as shown in Figs. 1 and 2. The brace is operated by a pair of links 23, which connect its lower end with a yoke 24, extending up over the guides and connecting with the slide 12, as shown in Figs. 2 and 3. The brace 22 is broad enough to engage both prongs of the fork near the head. When the slide 12 is moved forward, the supports are thrown down, and at the same time the brace 22 is moved against the front fork, as shown in full lines in Fig. 2. When the slide is moved rearward, the supports are thrown up in the dotted position shown in Fig. 2, and the brace 22 swings back under them and supports their ends, thus preventing any possibility of the supports becoming free and dropping while the bicycle is in operation.

For temporary purposes the latch alone may be used; but if it is desired to prevent the wheel from being stolen the lock 18 may be brought into action. It will be obvious that the bicycle cannot be ridden by any one until the handle-bar and fork can be moved to steer the front wheel. Furthermore, the legs will be locked in their operative position, which would also prevent the wheel from being stolen.

My improved bicycle support and locking device may be used with a lady's bicycle, termed a "drop-frame" bicycle, as well as with the diamond frame, such as is shown in the drawings. It may be built and sold with the bicycle, if so desired; but I have particularly designed it to be put on the market as a separate article, which can be readily connected to any bicycle of ordinary construction.

What I claim, and desire to secure by Letters Patent, is—

1. The combination with a bicycle having the front fork and lower bar 3, of a brace pivotally connected to said bar and having a broad forward end adapted to swing into direct engagement with said fork, a support also pivoted to said bar, and connections between said brace and support whereby they may be moved into and out of operative position simultaneously, substantially as described.

2. The combination with a bicycle having a front fork and a lower bar 3 of a brace pivotally connected to said bar and having a broad forward end adapted to swing into direct engagement with both members of said fork, a support also pivoted to said bar, a locking-slide on said bar, links connecting said brace to said slide, and a rod connecting said slide to said support, substantially as described.

3. The combination with a bicycle having the front fork and a lower bar 3, of a brace pivotally connected to said bar and having a broad forward end adapted to engage directly with both members of the fork, and means for locking said brace against the fork, substantially as described.

In testimony whereof I affix my signature in presence of two witnesses.

WALTER C. HUMPHREYS.

Witnesses:
J. A. WATSON,
W. CLARENCE DUVALL.